(12) United States Patent
Kitano et al.

(10) Patent No.: US 12,330,903 B2
(45) Date of Patent: Jun. 17, 2025

(54) MEDIUM CONVEYANCE DEVICE, CONTROL METHOD, AND CONTROL PROGRAM

(71) Applicant: PFU LIMITED, Kahoku (JP)

(72) Inventors: Hiroyuki Kitano, Kahoku (JP); Seiichi Takeda, Kahoku (JP); Tomohiro Murakami, Kahoku (JP)

(73) Assignee: PFU LIMITED, Kahoku (JP)

( * ) Notice: Subject to any disclaimer, the term of this patent is extended or adjusted under 35 U.S.C. 154(b) by 173 days.

(21) Appl. No.: 18/252,595

(22) PCT Filed: Jan. 13, 2021

(86) PCT No.: PCT/JP2021/000897
§ 371 (c)(1),
(2) Date: May 11, 2023

(87) PCT Pub. No.: WO2022/153408
PCT Pub. Date: Jul. 21, 2022

(65) Prior Publication Data
US 2024/0002181 A1    Jan. 4, 2024

(51) Int. Cl.
*B65H 7/12* (2006.01)
*B65H 7/08* (2006.01)

(52) U.S. Cl.
CPC .............. *B65H 7/125* (2013.01); *B65H 7/08* (2013.01); *B65H 2553/30* (2013.01)

(58) Field of Classification Search
CPC .......... B65H 3/5261; B65H 7/02; B65H 7/06; B65H 7/08; B65H 7/12; B65H 7/125;
(Continued)

(56) References Cited

U.S. PATENT DOCUMENTS

| | | | |
|---|---|---|---|
| 2011/0278790 A1 | 11/2011 | Yamagishi et al. | |
| 2011/0282487 A1* | 11/2011 | Niwano | B65H 7/12 700/228 |
| 2021/0032058 A1* | 2/2021 | Takatsuki | B65H 7/06 |

FOREIGN PATENT DOCUMENTS

| | | |
|---|---|---|
| JP | 2011-244090 | 12/2011 |
| JP | 2015-78039 A | 4/2015 |

OTHER PUBLICATIONS

International Search Report dated Mar. 16, 2021 regarding Japanese Patent Application No. PCT/JP2021/000897 corresponding to U.S. Appl. No. 18/252,595 (3 pages) with English Translation (2 pages).

(Continued)

*Primary Examiner* — Prasad V Gokhale
(74) *Attorney, Agent, or Firm* — Womble Bond Dickinson (US) LLP

(57) ABSTRACT

Provided are a medium conveyance apparatus, control method, and control program to enable determining whether multi-feed of a medium has occurred by a greater precision. A medium conveyance apparatus includes a storage device to store in advance region information of a predetermined region in a medium, a feed roller to feed the medium, a slant detection module to detect an amount of slant of the fed medium, an overlap detection module to detect region information of a region in which overlap has occurred in the fed medium, a correction module to correct the detected region information based on the amount of slant, and a multi-feed determination module to determine that multi-feed of the medium has occurred if the corrected region information does not correspond to the stored region information and determine that multi-feed of the medium has not occurred if the corrected region information corresponds to the stored region information.

12 Claims, 13 Drawing Sheets

(58) Field of Classification Search
CPC .. B65H 7/14; B65H 2511/13; B65H 2511/21; B65H 2511/214; B65H 2511/216; B65H 2553/30; B65H 2553/412; B65H 2553/414; B65H 2553/416
See application file for complete search history.

(56) References Cited

OTHER PUBLICATIONS

Written Opinion Report dated Mar. 16, 2021 regarding Japanese Patent Application No. PCT/JP2021/000897 corresponding to U.S. Appl. No. 18/252,595 (3 pages) with English Translation (3 pages).
International Preliminary Report on Patentability Report dated Jul. 4, 2023 regarding Japanese Patent Application No. PCT/JP2021/000897 corresponding to U.S. Appl. No. 18/252,595 (4 pages) with English Translation (4 pages).

* cited by examiner

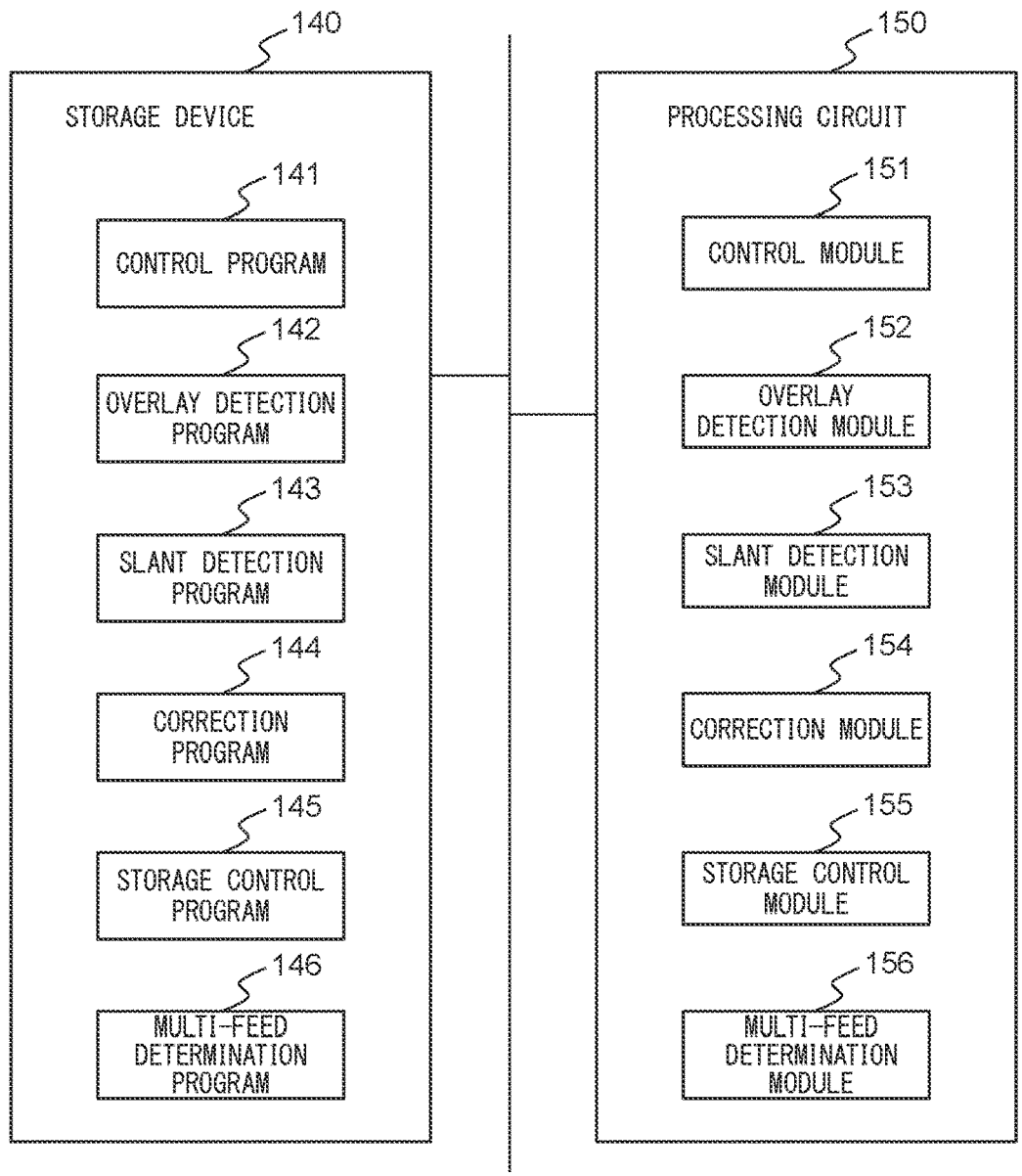

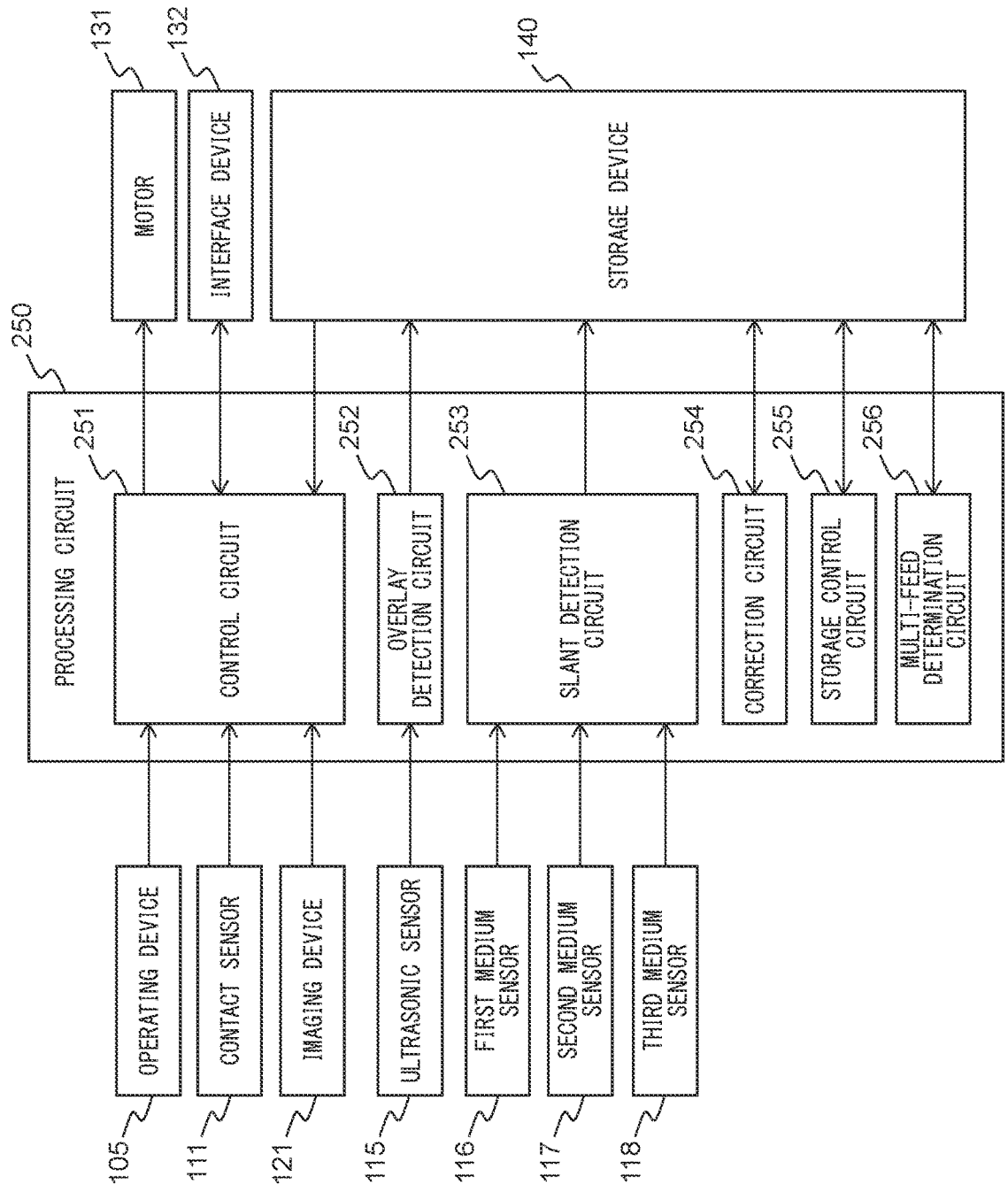

MEDIUM CONVEYANCE DEVICE, CONTROL METHOD, AND CONTROL PROGRAM

CROSS-REFERENCE TO RELATED APPLICATION(S)

This application is a U.S. National Phase Patent Application and claims priority to and the benefit of International Application Number PCT/JP2021/000897, filed on Jan. 13, 2021, the entire content of which is incorporated herein by reference.

FIELD

The present disclosure relates to a medium conveyance apparatus, more particularly relates to a medium conveyance apparatus to determine whether multi-feed of a medium has occurred.

BACKGROUND

In general, a scanner or other medium conveyance apparatus has the function of detecting whether multi-feed, the phenomenon where several sheets of a medium are conveyed overlaid, has occurred and automatically stopping conveyance of the medium at the time multi-feed has occurred. However, if a medium to which a photograph is adhered, such as a resume, is conveyed, there is a possibility that the medium conveyance apparatus will end up determining that multi-feed has occurred and conveyance will be stopped.

An image reading apparatus which detects a top end and bottom end of an adhered part based on output of an ultrasonic sensor and, if the amount of fluctuation of output of the ultrasonic sensor at the adhered part becomes a predetermined magnitude or more, deems that something has been adhered and ignores the detection of multi-feed by a multi-feed detection unit has been disclosed (see Patent Literature 1).

A sheet conveyance apparatus which has a sheet detection module for detecting multi-feed of sheets has been disclosed (see Patent Literature 2). The sheet conveyance apparatus conveys a sheet in the reverse direction, then resends the sheet toward a forward direction when a level of output of the sheet detection module becomes a value within a multi-feed range. The sheet conveyance device determines that multi-feed has occurred when a time difference between a first time period from first arrival of a sheet at a predetermined position to when the value becomes within a multi-feed range and a second time period from second arrival of the sheet at the predetermined position to when the value becomes within a multi-feed range due to resending exceeds an allowable range.

CITATION LIST

Patent Literature

Patent Literature 1: Japanese Unexamined Patent Publication No. 2011-244090
Patent Literature 2: Japanese Unexamined Patent Publication No. 2015-78039

SUMMARY

In a medium conveyance apparatus, it is desirable to determine with greater precision as to whether multi-feed of the medium has occurred.

An object of the medium conveyance apparatus, control method, and control program is to enable determining with greater precision as to whether multi-feed of the medium has occurred.

According to some embodiments, a medium conveyance apparatus includes a storage device to store in advance region information of a predetermined region in a medium, a feed roller to feed the medium, a slant detection module to detect an amount of slant of the fed medium, an overlap detection module to detect region information of a region in which overlap has occurred in the fed medium, a correction module to correct the detected region information based on the amount of slant, and a multi-feed determination module to determine that multi-feed of the medium has occurred if the corrected region information does not correspond to the stored region information and determine that multi-feed of the medium has not occurred if the corrected region information corresponds to the stored region information.

According to some embodiments, a medium conveyance apparatus includes a storage device, a feed roller to feed a sample medium, a slant detection module to detect an amount of slant of the fed sample medium, an overlap detection module to detect region information of a region in which overlap has occurred in the fed sample medium, a correction module to correct the detected region information based on the amount of slant, a storage control module to store the corrected region information in the storage device, and a multi-feed determination module to determine that multi-feed of the medium has occurred if the region information detected for the medium fed after the corrected region information has been stored does not correspond to the stored region information, and determine that multi-feed has not occurred if the region information detected for the medium fed after the corrected region information has been stored corresponds to the stored region information.

According to some embodiments, a control method of a medium conveyance apparatus having a storage device to store in advance region information of a predetermined region in a medium, and a feed roller to feed the medium, includes detecting an amount of slant of the fed medium, detecting region information of a region in which overlap has occurred in the fed medium, correcting the detected region information based on the amount of slant, and determining that multi-feed of the medium has occurred if the corrected region information does not correspond to the stored region information and determining that multi-feed of the medium has not occurred if the corrected region information corresponds to the stored region information.

According to some embodiments, a control method of a medium conveyance apparatus having a storage device, and a feed roller to feed a sample medium, includes detecting an amount of slant of the fed sample medium, detecting region information of a region in which overlap has occurred in the fed sample medium, correcting the detected region information based on the amount of slant, storing the corrected region information in the storage device, and determining that multi-feed of the medium has occurred if the region information detected for the medium fed after the corrected region information has been stored does not correspond to the stored region information, and determining that multi-feed has not occurred if the region information detected for the medium fed after the corrected region information has been stored corresponds to the stored region information.

According to some embodiments, a control program of a medium conveyance apparatus having a storage device to store in advance region information of a predetermined region in a medium, and a feed roller to feed the medium, causes the medium conveyance apparatus to execute detecting an amount of slant of the fed medium, detecting region information of a region in which overlap has occurred in the fed medium, correcting the detected region information based on the amount of slant, and determining that multi-feed of the medium has occurred if the corrected region information does not correspond to the stored region information and determining that multi-feed of the medium has not occurred if the corrected region information corresponds to the stored region information.

According to some embodiments, a control program of a medium conveyance apparatus having a storage device, and a feed roller to feed a sample medium, causes the medium conveying apparatus to execute detecting an amount of slant of the fed sample medium, detecting region information of a region in which overlap has occurred in the fed sample medium, correcting the detected region information based on the amount of slant, storing the corrected region information in the storage device, and determining that multi-feed of the medium has occurred if the region information detected for the medium fed after the corrected region information has been stored does not correspond to the stored region information, and determining that multi-feed has not occurred if the region information detected for the medium fed after the corrected region information has been stored corresponds to the stored region information.

According to the embodiments, the medium conveyance apparatus, control method, and control program can determine with greater precision as to whether multi-feed of the medium has occurred.

The object and advantages of the invention will be realized and attained by means of the elements and combinations, in particular, described in the claims. It is to be understood that both the foregoing general description and the following detailed description are exemplary and explanatory, and are not restrictive of the invention, as claimed.

BRIEF DESCRIPTION OF DRAWINGS

FIG. 5 is a view showing the schematic constitution of a storage device 140 and a processing circuit 150.

FIG. 6 is a view showing one example of a data structure of a region table.

FIG. 14 is a view showing the schematic constitution of a processing circuit 250 in another medium conveyance apparatus.

DESCRIPTION OF EMBODIMENTS

Hereinafter, a medium conveyance apparatus, a control method and a control program according to an embodiment will be described with reference to the drawings. However, it should be noted that the technical scope of the invention is not limited to these embodiments, and extends to the inventions described in the claims and their equivalents.

Figure 1:
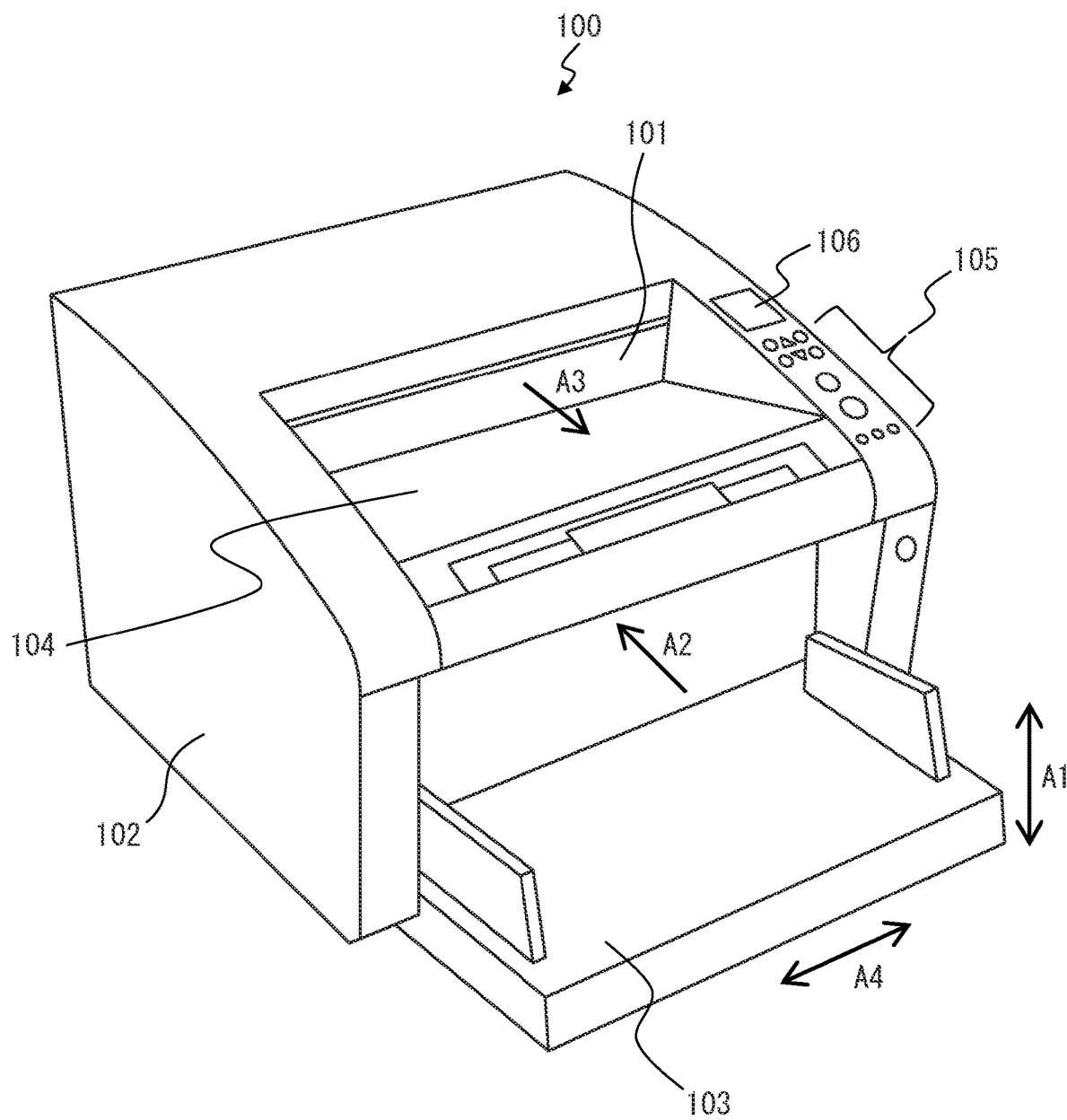
FIG. 1 is a perspective view showing a medium conveyance apparatus 100 according to an embodiment.

FIG. 1 is a perspective view showing a medium conveyance apparatus 100 constituted as an image scanner. The medium conveyance apparatus 100 conveys a document medium and captures an image of it. The medium is printing paper, thick paper, a card, etc. The medium conveyance apparatus 100 may also be a facsimile, copier, multifunction peripheral (MFP), etc. The medium to be conveyed may be an object to be printed out rather than a document; and the medium conveying apparatus 100 may be a printer, etc.

The medium conveyance apparatus 100 is provided with a first housing 101, second housing 102, stacking tray 103, ejection tray 104, operating device 105, display device 106, etc.

The first housing 101 is located above the medium conveyance apparatus 100 and engages with the second housing 102 by a hinge so as to be able to open and close at the time of jamming of the medium, the time of cleaning the inside of the medium conveyance apparatus 100, etc.

The stacking tray 103 engages with the second housing 102 to be able to stack the conveyed medium. The stacking tray 103 is provided at the side surface at the medium feed side of the second housing 102 to be able to move in a substantially vertical direction (height direction) A1 by a not shown motor. The stacking tray 103 is located at the position of a bottom end so that the medium is easily stacked when not conveying the medium, and rises to a position at which the medium stacked at the top most side contacts a later explained pick roller when conveying the medium. The ejection tray 104 is formed on the first housing 101 to be able to hold the ejected medium and stack the ejected medium.

The operating device 105 has buttons or other input devices and an interface circuit for acquiring signals from the input devices, receives input operations of a user, and outputs operating signals corresponding to the input operations of a user. The display device 106 has a display including liquid crystals, organic Els (Electro-Luminescence), etc., and an interface circuit for outputting image data to the display and displays the image data on the display.

In FIG. 1, an arrow A2 shows the medium conveyance direction, an arrow A3 shows the medium ejection direction, and an arrow A4 shows a width direction perpendicular to the medium conveyance direction. Below, "upstream" will mean upstream of the medium in the medium conveyance direction A2 or medium ejection direction A3, while "downstream" means downstream in the medium conveyance direction A2 or medium ejection direction A3.

Figure 2:
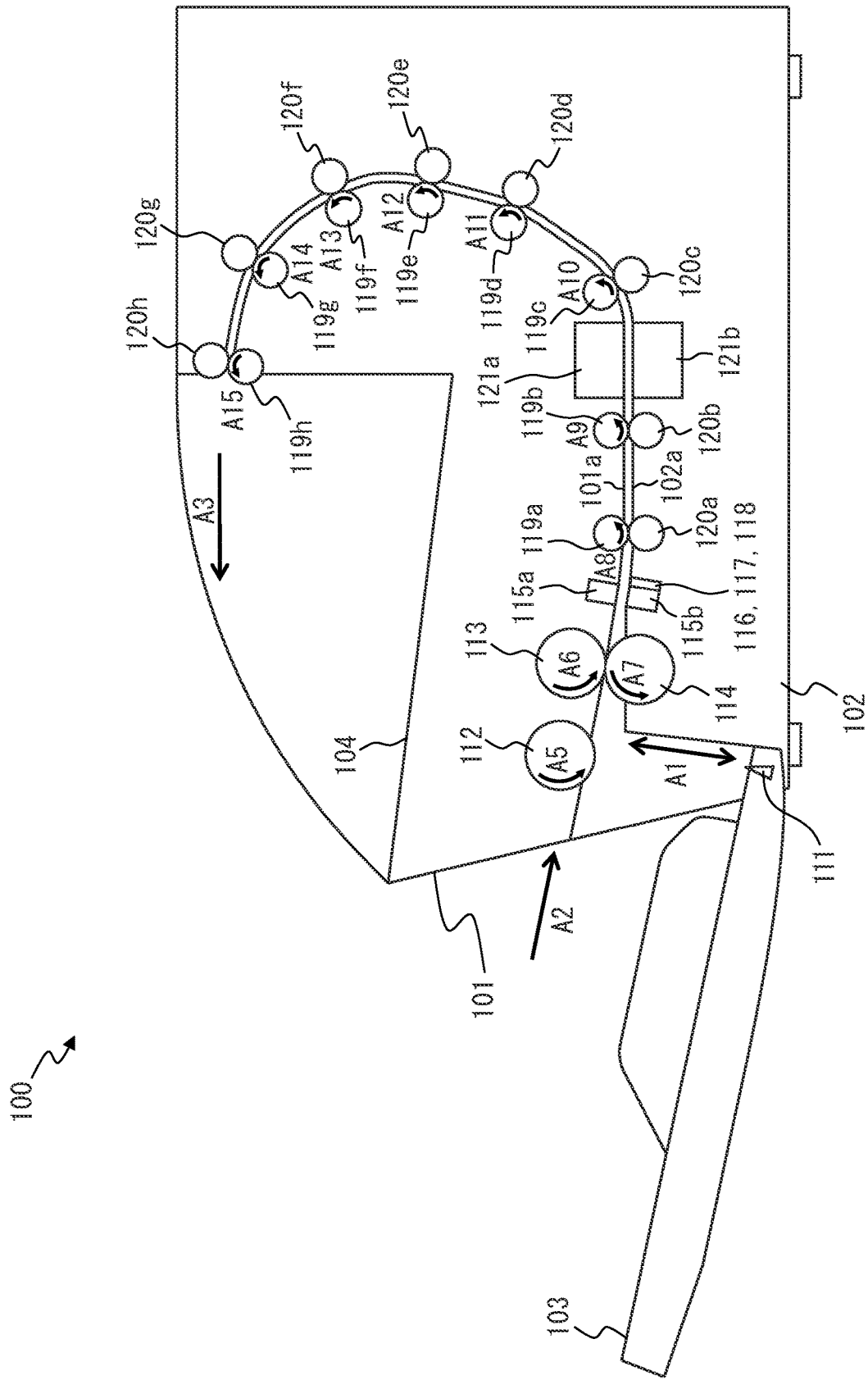
FIG. 2 is a view for explaining a conveyance route at the inside of the medium conveyance apparatus 100.

FIG. 2 is a view for explaining a conveyance route inside of the medium conveyance apparatus 100.

The conveyance route inside of the medium conveyance apparatus 100 includes a contact sensor 111, a pick roller 112, a feed roller 113, a brake roller 114, an ultrasonic emitter 115a, an ultrasonic receiver 115b, a first medium sensor 116, a second medium sensor 117, a third medium sensor 118, first to eighth conveyance rollers 119a to 119h, first to eighth driven rollers 120a to 120h, a first imaging device 121a and a second imaging device 121b, etc.

The pick roller 112, feed roller 113, brake roller 114, first to eighth conveyance rollers 119a to 119h and first to eighth driven rollers 120a to 120h are examples of the conveying part to convey the medium. Note that, the pick roller 112, feed roller 113, brake roller 114, first to eighth conveyance rollers 119a to 119h, and/or first to eighth driven rollers 120a to 120h are not limited in number to single ones. Multiple ones are also possible. In this case, the pluralities of pick rollers 112, feed rollers 113, brake rollers 114, first to eighth conveyance rollers 119a to 119h, and/or first to eighth driven rollers 120a to 120h are respectively located at intervals in the width direction. Below, the first imaging device 121a and second imaging device 121b will sometimes be referred to together as "imaging devices 121".

The surface of the first housing 101 facing the second housing 102 forms a first guide 101a of the conveyance path of the medium, while the surface of the second housing 102 facing the first housing 101 forms a second guide 102a of the conveyance path of the medium.

The contact sensor 111 is located on the stacking tray 103, i.e., at the upstream side from the feed roller 113 and brake roller 114, and detects the stacked state of the medium at the stacking tray 103. The contact sensor 111 detects whether a medium is stacked on the stacking tray 103 by a contact detection sensor which runs a predetermined current if a medium is contacted or if a medium is not contacted. The contact sensor 111 generates and outputs a contact signal changing in signal value between the state where a medium is stacked on the stacking tray 103 and the state where it is not stacked there.

The pick roller 112 is provided at the first housing 101 and contacts the medium stacked on the stacking tray 103 which has risen up to substantially the same height as the medium conveyance path and feeds that medium toward the downstream side.

The feed roller 113 is provided inside the first housing 101 at the downstream side from the pick roller 112 and feeds the medium stacked on the stacking tray 103 and fed by the pick roller 112 to the further downstream side. The brake roller 114 is located inside the second housing 102 facing the feed roller 113. The feed roller 113 and brake roller 114 perform the operation for separating the medium and separates and feeds the medium one sheet at a time. The feed roller 113 is located at the upstream side with respect to the brake roller 114. The medium conveyance apparatus 100 feeds the medium by the so-called "top feed system".

The ultrasonic emitter 115a and ultrasonic receiver 115b are located at the downstream side from the feed roller 113 and brake roller 114 and at the upstream side from the first to eighth conveyance rollers 119a to 119h and first to eighth driven rollers 120a to 120h. The ultrasonic emitter 115a and ultrasonic receiver 115b are located in the vicinity of the conveyance path of the medium across the conveyance path. The ultrasonic emitter 115a is one example of an ultrasonic emitting part and emits an ultrasonic wave. On the other hand, the ultrasonic receiver 115b is one example of an ultrasonic receiving part. It receives an ultrasonic wave emitted by the ultrasonic emitter 115a and running through the medium and generates and outputs an electrical signal corresponding to the received ultrasonic wave as an ultrasonic signal. The ultrasonic signal shows the magnitude of the ultrasonic wave passing through the medium at different positions of the conveyed medium. Below, the ultrasonic emitter 115a and ultrasonic receiver 115b will sometimes be referred to together as the "ultrasonic sensor 115".

The first to eighth conveyance rollers 119a to 119h and first to eighth driven rollers 120a to 120h are provided at the downstream side from the feed roller 113 and brake roller 114 and convey the medium fed by the feed roller 113 and brake roller 114 toward the downstream side. The first to eighth conveyance rollers 119a to 119h and first to eighth driven rollers 120a to 120h are located facing each other across the medium conveyance path.

The first imaging device 121a is one example of an imaging part and is provided at the downstream side from the first conveyance roller 119a and the first driven roller 120a in the medium conveyance direction A2, i.e., at the downstream side from the ultrasonic sensor 115. The first imaging device 121a has a contact optical system type CIS (contact image sensor) line sensor having imaging elements comprised of CMOS's (complementary metal oxide semiconductors) located in a line in the main scan direction. Further, the first imaging device 121a has a lens for forming an image on an imaging element and an A/D converter for amplifying the electrical signal output from the imaging element and converting it from an analog to digital (A/D) format. The first imaging device 121a captures an image of the front surface of the conveyed medium and generates and outputs an input image.

Similarly, the second imaging device 121b is one example of an imaging part and is provided at the downstream side from the first conveyance roller 119a and the first driven roller 120a in the medium conveyance direction A2. The second imaging device 121b has a contact optical system type CIS line sensor having imaging elements comprised of CMOS's located in a line in the main scan direction. Further, the second imaging device 121b has a lens for forming an image on an imaging element and an A/D converter for amplifying the electrical signal output from the imaging element and converting it from an analog to digital (A/D) format. The second imaging device 121b captures and outputs an image of the back surface of the conveyed medium.

The medium conveyance apparatus 100 may also have only one of the first imaging device 121a and the second imaging device 121b located at it and read only one surface of the medium. Further, instead of a contact optical system type CIS line sensor provided with imaging elements comprised of CMOS's, a contact optical system type CIS line sensor provided with imaging elements comprised of CCDs (charge coupled devices) may also be utilized. Further, a reduction optical system type line sensor provided with imaging elements comprised of CMOS's or CCD's may also be utilized.

The medium stacked on the stacking tray 103 is conveyed between the first guide 101a and the second guide 102a toward the medium conveyance direction A2 by the pick roller 112 and the feed roller 113 rotating in the medium feed directions A5 and A6. On the other hand, due to the brake roller 114 rotating in the opposite direction A7 of the medium feed direction, if the stacking tray 103 has a plurality of the medium stacked on it, only the medium contacting the feed roller 113 in the medium stacked on the stacking tray 103 will be separated.

The medium is guided by the first guide 101a and second guide 102a while the first to second conveyance rollers 119a to 119b rotate in the directions of the arrows A8 to A9 whereby it is fed to the imaging positions of the imaging devices 121 and is captured by the imaging devices 121. Further, the medium is ejected on the ejection tray 104 by the third to eighth conveyance rollers 119c to 119h rotating in the directions of the arrows A10 to A15. The ejection tray 104 stacks the medium ejected by the eighth conveyance roller 119h.

Figure 3:
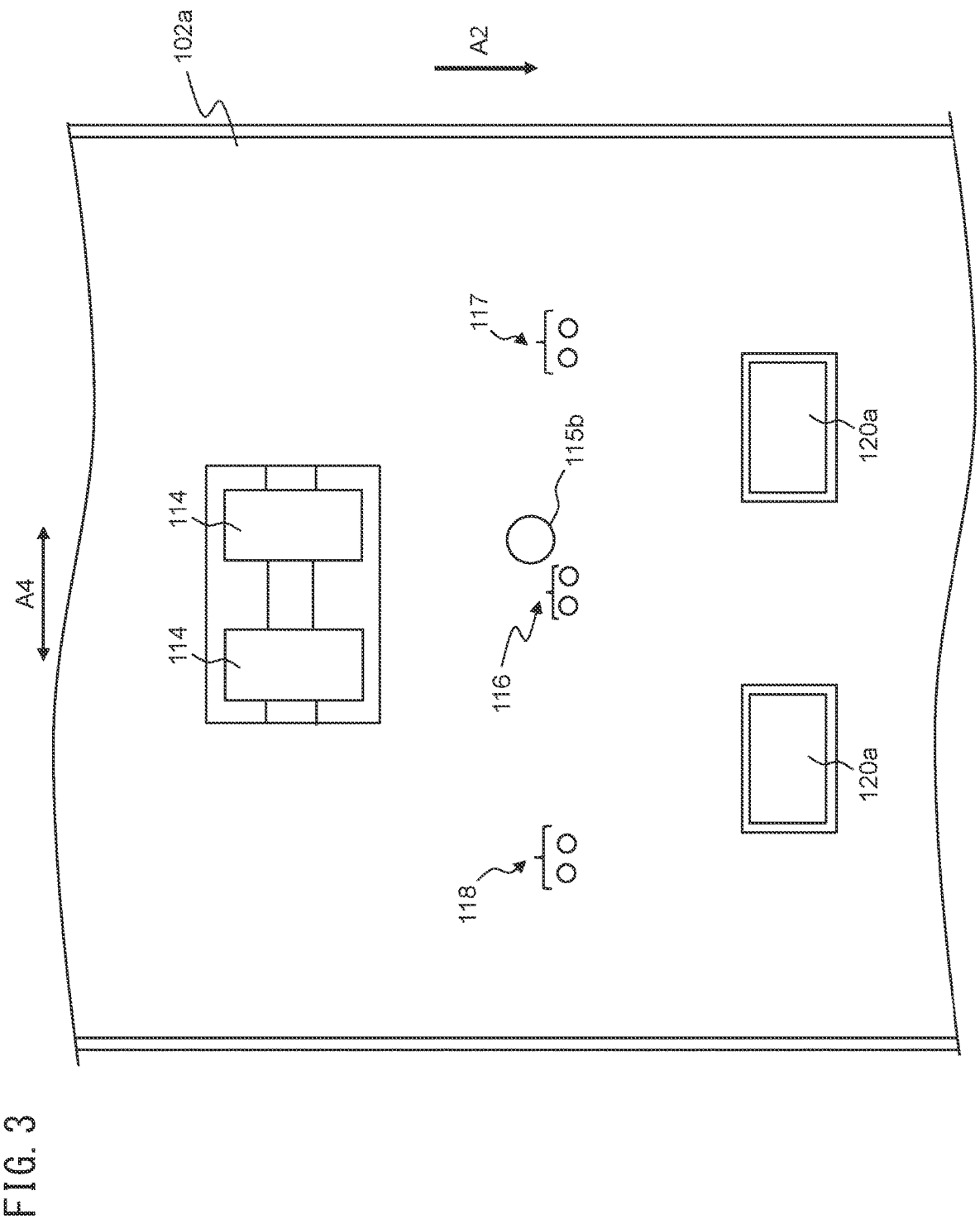
FIG. 3 is a schematic view for explaining an arrangement of a first medium sensor 116 etc.

FIG. 3 is a schematic view for explaining the arrangement of the first medium sensor 116, second medium sensor 117, and third medium sensor 118. FIG. 3 is a schematic view of the second housing 102 seen from above in the state opening the first housing 101.

The first medium sensor 116, second medium sensor 117, and third medium sensor 118 are examples of the plurality of medium sensors. The first medium sensor 116, second medium sensor 117, and third medium sensor 118 are located in the medium conveyance direction A2 at the downstream side from the feed roller 113 and brake roller 114 and at the upstream side from the first conveyance roller 119a and first driven roller 120a. In particular, the first medium sensor 116, second medium sensor 117, and third medium sensor 118 are located in the medium conveyance direction A2 in the vicinity of the ultrasonic emitter 115a and ultrasonic receiver 115b. Further, the first medium sensor 116, second medium sensor 117, and third medium sensor 118 are located at intervals in the width direction A4 perpendicular to the medium conveyance direction. The first medium sensor 116 is located at the center in the width direction A4 in particular in the vicinity of the ultrasonic sensor 115. The second medium sensor 117 and third medium sensor 118 are located in the width direction A4 at the outside from the first medium sensor 116.

A medium sensor detects whether there is a medium at its position. A medium sensor includes a light emitter and light receiver provided at one side of the conveyance path of the medium and a mirror or other reflection member provided at a position facing the light emitter and light receiver across the conveyance path. The light emitter emits light toward the conveyance path. On the other hand, the light receiver receives light emitted from the light emitter and reflected by the reflection member and generates and outputs an electrical signal corresponding to the intensity of the light received as a medium signal. The first medium sensor 116, second medium sensor 117, and third medium sensor 118 respectively generate a first medium signal, second medium signal, and third medium signal. The first medium signal, second medium signal, and third medium signal are examples of the output signals from the first medium sensor 116, second medium sensor 117, and third medium sensor 118. If there is a medium present at the position of an individual medium sensor, the light emitted from the light emitter is blocked by the medium, so the signal value of the medium signal changes between a state where there is a medium present at the position of the medium sensor and a state where there is none present. Note that, the light emitters and light receivers may be provided at positions facing each other across the conveyance path and reflection members may be omitted.

Note that there the invention is not limited to a single ultrasonic sensor 115. A plurality may also be provided. In this case, the plurality of ultrasonic sensors 115 are located aligned at intervals in the width direction A4.

Figure 4:
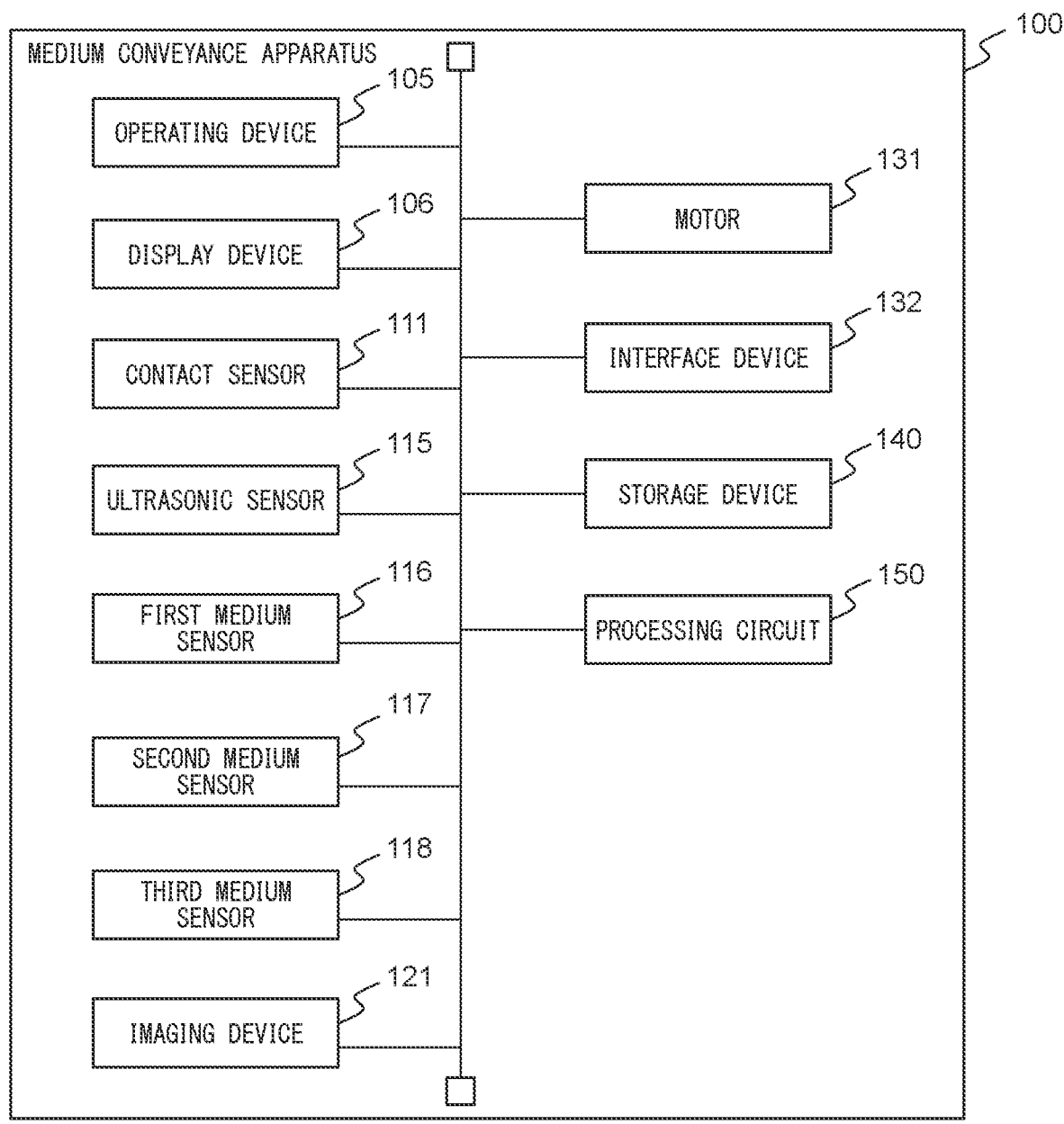
FIG. 4 is a block diagram showing the schematic constitution of the medium conveyance apparatus 100.

FIG. 4 is a block diagram showing the schematic constitution of the medium conveyance apparatus 100.

The medium conveyance apparatus 100 further has, in addition to the above-mentioned constitution, a motor 131, interface device 132, storage device 140, processing circuit 150, etc.

The motor 131 includes one or more motors and makes the pick roller 112, feed roller 113, brake roller 114, and first to eighth conveyance rollers 119a to 119h rotate to feed and convey the medium by control signals from the processing circuit 150. Note that, the first to eighth driven rollers 120a to 120h may also be provided to rotate by drive force from a motor rather than being driven to rotate in accordance with rotation of the conveyance rollers.

The interface device 132 has an interface circuit based on for example a USB or other serial bus and is electrically connected with a not shown information processing apparatus (for example, a personal computer, mobile information terminal, etc.) to transmit and receive read images and various information. Further, instead of the interface device 132, a communication module having an antenna transmitting and receiving wireless signals and a wireless communication interface circuit for transmitting and receiving signals through a wireless communication line in accordance with a predetermined communication protocol may be used. The predetermined communication protocol is for example a wireless LAN (local area network).

The storage device 140 is an example of a storage module. The storage device 140 has a RAM (random access memory), ROM (read only memory), or other memory device, hard disk or other fixed disk device, flexible disk, optical disk, or other portable storage device, etc. Further, the storage device 140 stores computer programs, databases, tables, etc., used for various processing of the medium conveyance apparatus 100. The computer programs may be installed on the storage device 140 from a computer-readable, non-transitory medium such as a CD-ROM (compact disc read only memory), DVD-ROM (digital versatile disc read only memory), etc., by using a well-known setup program, etc.

Further, the storage device 140 stores in advance, as data, a region table for registering region information of an adhered region on which a photograph, stamp, or other specific medium is adhered in a resume or ledger or other medium having a predetermined form. The adhered region is one example of a predetermined region in the medium. Details of the region table will be explained later.

The processing circuit 150 operates based on programs stored in advance in the storage device 140. Note that instead of the processing circuit 150, a DSP (digital signal processor), LSI (large scale integrated circuit), ASIC (application specific integrated circuit), FPGA (field-programmable gate array), etc., may also be used.

The processing circuit 150 is connected with an operating device 105, display device 106, contact sensor 111, ultrasonic sensor 115, first medium sensor 116, second medium sensor 117, third medium sensor 118, imaging devices 121, motor 131, interface device 132, storage device 140, etc., and controls these modules. The processing circuit 150 controls the motor 131 to convey the medium, controls the imaging device 121 to acquire an input image, and sends the acquired input image through the interface device 132 to an information processing apparatus. Further, the processing circuit 150 detects the amount of slant of the fed medium based on the medium signals received from the medium sensors and detects region information of a region where overlap has occurred in the medium based on an ultrasonic signal received from the ultrasonic sensor 115. The processing circuit 150 corrects the region information based on the detected amount of slant and determines whether multi-feed of the medium has occurred based on the corrected region information.

FIG. 5 is a view showing the schematic constitution of the storage device 140 and the processing circuit 150.

As shown in FIG. 5, the storage device 140 stores a control program 141, overlap detection program 142, slant detection program 143, correction program 144, storage control program 145, multi-feed determination program 146, and other programs. These programs are function modules loaded by software operating on the processor. The processing circuit 150 reads the programs stored in the storage device 140 and operates in accordance with the read programs to thereby function as a control module 151, overlap detection module 152, slant detection module 153, correction module 154, storage control module 155, and multi-feed determination module 156.

FIG. 6 is a view showing one example of the data structure of the region table.

As shown in FIG. 6, the region table stores identification information of each adhered region (region ID) and region information, etc., linked together for each of one or more adhered regions in the conveyed medium. The region information for example includes a position and length. As the position, for example, the distance from the front end of the medium in the length direction perpendicular to the width direction of the medium to the front end, center, or rear end of each adhered region is set. As the length, for example, the distance from the front end to the rear end of each adhered region in the length direction perpendicular to the width direction of the medium is set. Note that, the region information may also include just one of the position or length. Further, the region information may for example include a front end position and rear end position of an adhered region and need not include length. If the medium conveyance apparatus 100 has a plurality of ultrasonic sensors 115, adhered regions are set at each position of arrangement of the ultrasonic sensors 115 at the width direction A4.

Figure 7:
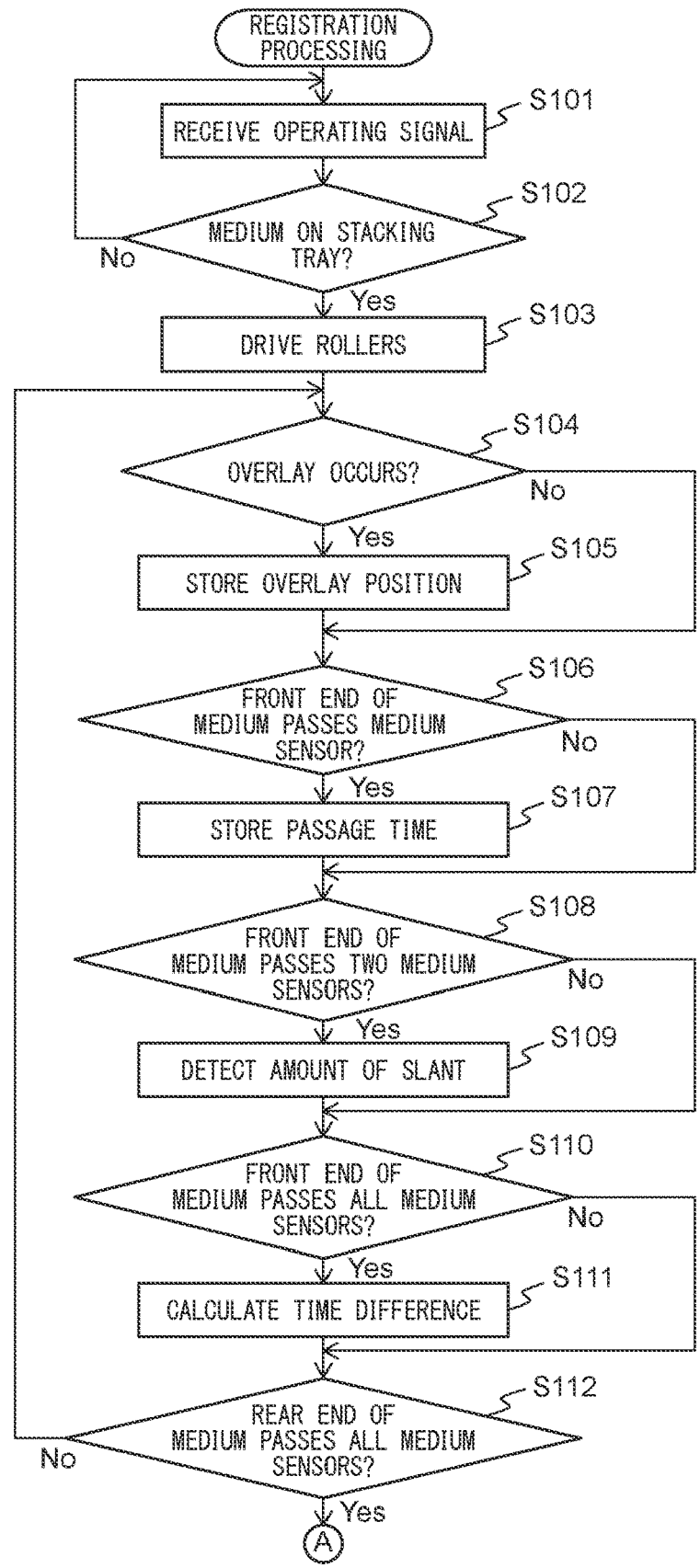
FIG. 7 is a flow chart showing an example of operation of registration processing.
Figure 8:
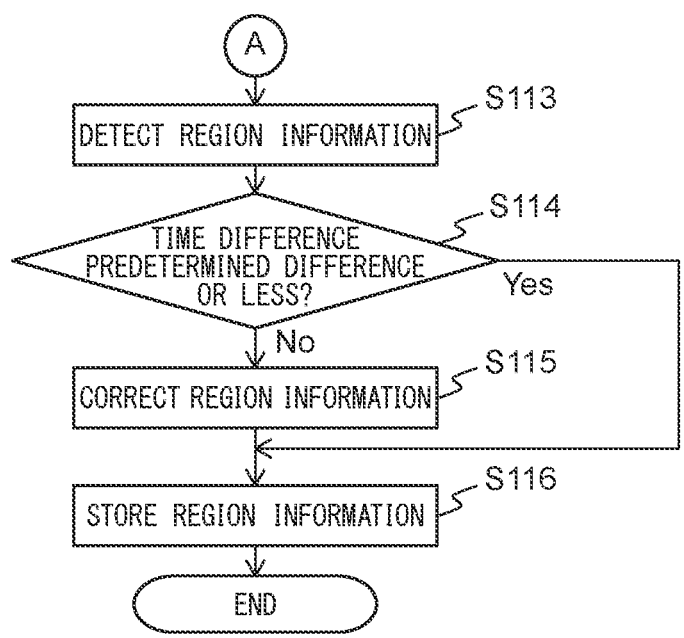
FIG. 8 is a flow chart showing an example of operation of registration processing.

FIG. 7 and FIG. 8 are flow charts showing the example of operation of the registration processing.

Below, referring to the flow charts shown in FIG. 7 and FIG. 8, an example of operation of the registration processing of the medium conveyance apparatus 100 will be explained. Note that the flow of the operation explained below is mainly performed by the processing circuit 150 in cooperation with the elements of the medium conveyance apparatus 100 based on programs stored in advance in the storage device 140. The registration processing is performed by the user in the state where a sample medium is set at the stacking tray 103. The sample medium is a medium for registering an adhered region in the medium conveyance apparatus 100. It is a resume, ledger, or other medium to which a photograph, stamp, or other specific medium is adhered at a predetermined region.

First, the control module 151 stands by until a user inputs an instruction for registration of an adhered region using the operating device 105 or an information processing apparatus and it receives an operating instruction for instructing registration of the adhered region from the operating device 105 or interface device 132 (step S101).

Next, the control module 151 acquires a contact signal from the contact sensor 111 and determines whether the sample medium is stacked on the stacking tray 103 based on the acquired contact signal (step S102). If the sample medium is not stacked on the stacking tray 103, the control module 151 returns the processing to step S101 and stands by until newly receiving an operating signal from the operating device 105 or interface device 132.

On the other hand, if the sample medium is stacked on the stacking tray 103, the control module 151 drives the motor for making the stacking tray 103 move and makes the stacking tray 103 move to a position able to feed the sample medium. The control module 151 drives the motor 131 to make the pick roller 112, feed roller 113, brake roller 114, and first to eighth conveyance rollers 119a to 119h rotate and feed and convey the sample medium stacked on the stacking tray 103 (step S103).

Next, the overlap detection module 152 receives an ultrasonic signal from the ultrasonic sensor 115 and determines whether overlap of the medium has occurred based on the received ultrasonic signal (step S104). If the signal value of the ultrasonic signal is less than a determination threshold value, the overlap detection module 152 determines that overlap of the medium has occurred at the position currently facing the ultrasonic sensor 115 in the medium. On the other hand, if the signal value of the ultrasonic signal is the determination threshold value or more, the overlap detection module 152 determines that overlap of the medium has not occurred at the position currently facing the ultrasonic sensor 115 in the medium.

Figure 9:
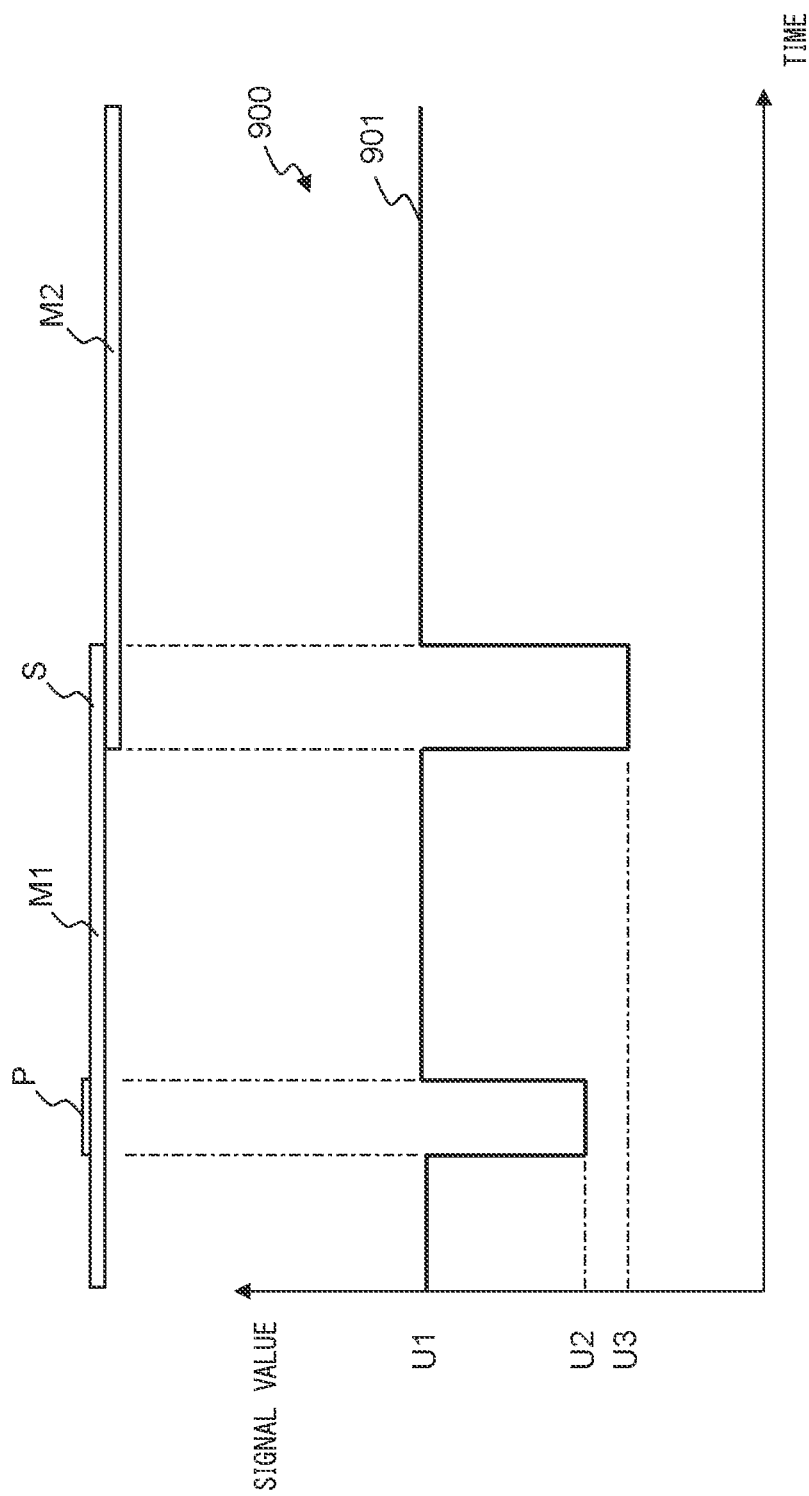
FIG. 9 is a graph 900 showing characteristics of an ultrasonic signal.

FIG. 9 is a graph 900 showing the characteristics of an ultrasonic signal.

In the graph 900, the solid line 901 shows the characteristic of the ultrasonic signal when a medium M1 and a medium M2 are conveyed overlaid. The medium M1 is a sheet of paper to which a photograph P is adhered. The end part S of the medium M1 at the rear end side is conveyed overlaid with the end part of the medium M2 at the front end side. In the graph 900, the abscissa shows the time and the ordinate shows the signal value of the ultrasonic signal. At the region where the photograph P is adhered in the medium M1, the signal value of the ultrasonic signal falls. Similarly, the signal value of the ultrasonic signal also falls at the part S where the medium M1 and the medium M2 are overlaid.

A signal value U2 of the ultrasonic signal in a region in the medium where a photograph is adhered and a signal value U3 of an ultrasonic signal in a region where two sheets of paper are overlaid are close to each other, so it is difficult to set a determination threshold value between the signal value U2 and the signal value U3. For this reason, the determination threshold value is set to between a signal value U1 of an ultrasonic signal in the region at which a single medium is present and a signal value U2 of an ultrasonic signal in the region in which a photograph is adhered in the medium. In this example, it is determined that overlap of the medium has occurred in the region at which a photograph P is adhered and the region overlaid with the medium M2 in the medium M1.

If overlap of the medium has not occurred, the overlap detection module 152 proceeds the processing to step S106.

On the other hand, if overlap of the medium has occurred, the overlap detection module 152 stores in the storage device 140 the position currently facing the ultrasonic sensor 115 in the sample medium as the position at which overlap has occurred in the sample medium (step S105). If the medium conveyance apparatus 100 has a plurality of ultrasonic sensors 115, the overlap detection module 152 stores the positions at which overlap occurs linked with the corresponding ultrasonic sensors 115.

The overlap detection module 152 periodically acquires the first medium signal from the first medium sensor 116 and determines that the front end of the medium has passed the position of the first medium sensor 116 when the signal value of the first medium signal has changed from a value showing there is no medium present to a value showing there is a medium present. The overlap detection module 152 determines that the front end of the medium has reached the position of an ultrasonic sensor 115 before or after the timing at which the front end of the medium passes the position of the first medium sensor 116 by exactly the movement time between the ultrasonic sensor 115 and the first medium sensor 116. Note that, the overlap detection module 152 may also determine that the front end of the medium has reached the position of an ultrasonic sensor 115 when a predetermined time has elapsed from starting feed of the medium.

The overlap detection module 152 identifies as the position currently facing an ultrasonic sensor 115 in the medium the multiplied value of the drive time during which the motor 131 was driven from when the front end of the medium reached the position of the ultrasonic sensor 115 to the present multiplied with the conveyance speed of the medium. The overlap detection module 152 may also identify as that position the multiplied value of the number of drive pulses of the motor 131 from when the front end of the medium reached the position of the ultrasonic sensor 115 to the present multiplied with the movement distance of the roller surface of the feed roller 113 per pulse.

Next, the slant detection module 153 determines if the front end of the fed sample medium has passed the position of the first medium sensor 116, second medium sensor 117, or third medium sensor 118 (step S106).

The slant detection module 153 periodically acquires the first medium signal from the first medium sensor 116 and determines that the front end of the medium has passed the position of the first medium sensor 116 when the signal value of the first medium signal changes from a value showing there is no medium present to a value showing there is a medium present. The slant detection module 153 periodically acquires the second medium signal from the second medium sensor 117 and determines that the front end of the medium has passed the position of the second medium sensor 117 when the signal value of the second medium signal changes from a value showing there is no medium present to a value showing there is a medium present. The slant detection module 153 periodically acquires the third medium signal from the third medium sensor 118 and determines that the front end of the medium has passed the position of the third medium sensor 118 when the signal value of the third medium signal changes from a value showing there is no medium present to a value showing there is a medium present.

If the front end of the sample medium has still not passed the position of the first medium sensor 116, second medium sensor 117, or third medium sensor 118, the slant detection module 153 proceeds the processing to step S108.

On the other hand, if the front end of the sample medium has passed the position of any of the first medium sensor 116, second medium sensor 117, or third medium sensor 118, the slant detection module 153 stores the current point of time as the point of time of passage (step S107). The slant detection module 153 may also store a number of drive pulses of the motor 131 up to the present as the number of pulses until passage instead of storing the point of time of passage.

Next, the slant detection module 153 determines whether the front end of the fed sample medium has passed the positions of any two medium sensors among the first medium sensor 116, second medium sensor 117, or third medium sensor 118 (step S108). If the front end of the sample medium has still not passed the positions of two medium sensors, the slant detection module 153 proceeds the processing to step S110.

On the other hand, when the front end of the sample medium passes the positions of any two medium sensors, the slant detection module 153 detects the amount of slant of the fed sample medium (step S109).

The slant detection module 153 for example detects as the amount of slant the divided value of the movement distance in the medium conveyance direction A2 from when the front end of the medium passes the position of one medium sensor to when it passes the position of another medium sensor divided by the distance between the two medium sensors. The slant detection module 153 identifies as the movement distance the multiplied value of the drive time during which the motor 131 is driven from when the front end of the medium passes the position of one medium sensor to when it passes the position of another medium sensor multiplied with the conveyance speed of the medium. The slant detection module 153 may also identify as the movement distance the multiplied value of the number of drive pulses of the motor 131 from when the front end of the medium passes the position of one medium sensor to when it passes the position of another medium sensor multiplied by the movement distance of the roller surface of the feed roller 113 per pulse. Further, the slant detection module 153 may also detect the arc tangent value of the calculated divided value as the amount of slant. In this way, the slant detection module 153 detects the amount of slant of the fed sample medium based on the first medium signal, second medium signal, and third medium signal from the first medium sensor 116, second medium sensor 117, and third medium sensor 118.

Figure 10:
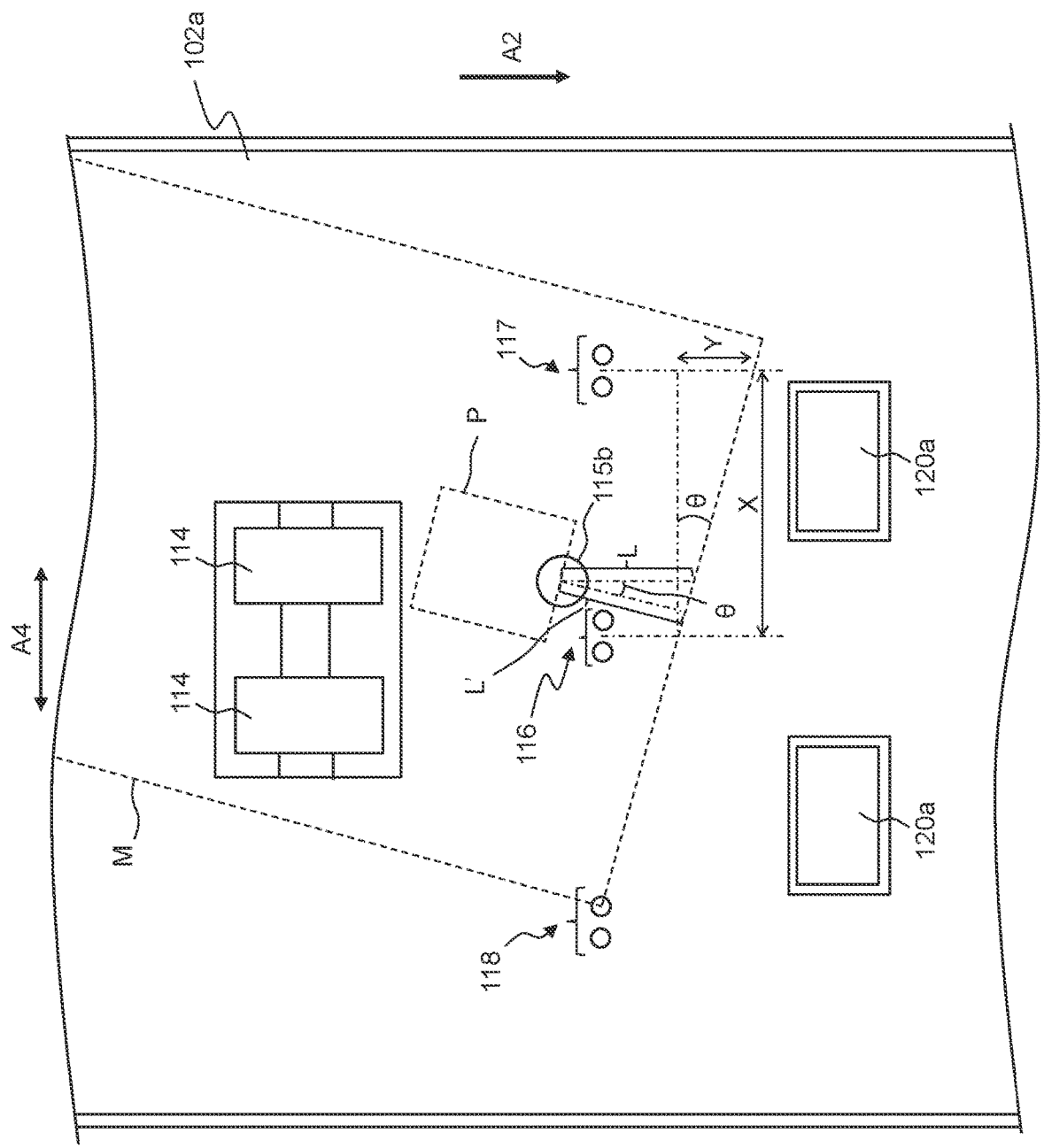
FIG. 10 is a schematic view for explaining slant of a medium.

FIG. 10 is a schematic view for explaining slant of the medium.

FIG. 10 shows an example where a medium M to which a photograph P is adhered is conveyed slanted. The front end of the medium M moves by exactly the movement distance Y from when passing the position of the second medium sensor 117 to when passing the position of the first medium sensor 116. In this case, the divided value Y/X (=tan θ) of the movement distance Y divided by the distance X between the first medium sensor 116 and the second medium sensor 117 is detected as the amount of slant. θ is the angle by which the fed medium is slanted with respect to the medium conveyance direction A2. Alternatively, the arc tangent value $\tan^{-1}(Y/X)$ (=θ) of the divided value Y/X is detected as the amount of slant.

Next, the overlap detection module 152 determines whether the front end of the fed sample medium has passed the positions of all of the medium sensors of the first medium sensor 116, second medium sensor 117, and third medium sensor 118 (step S110). If the front end of the sample medium has still not passed the positions of all of the medium sensors, the slant detection module 153 proceeds the processing to step S112.

On the other hand, if the front end of the sample medium passes the positions of all of the medium sensors, the slant detection module 153 calculates the time difference of passage of the front end of the sample medium over the positions of two of the medium sensors among the medium sensors (step S111). The slant detection module 153 extracts all of the pairs of two medium sensors from the first medium sensor 116, second medium sensor 117, and third medium sensor 118. The slant detection module 153 calculates the time difference of passage of the front end of the medium over the positions of the medium sensors for the extracted pairs.

Next, the overlap detection module 152 determines whether the rear end of the fed sample medium has passed the positions of all of the medium sensors of the first medium sensor 116, second medium sensor 117, and third medium sensor 118 (step S112). The overlap detection module 152 determines that the rear end of the medium has passed the position of the first medium sensor 116 when the signal value of the first medium signal changes from a value showing there is the medium present to a value showing there is no medium present. The overlap detection module 152 determines that the rear end of the medium has passed the position of the second medium sensor 117 when the signal value of the second medium signal changes from a value showing there is the medium present to a value showing there is no medium present. The overlap detection module 152 determines that the rear end of the medium has passed the position of the third medium sensor 118 when the signal value of the third medium signal changes from a value showing there is the medium present to a value showing there is no medium present. If the rear end of the sample medium has still not passed the positions of all of the medium sensors, the slant detection module 153 returns the processing to step S104 and repeats the processing of steps S104 to S112.

On the other hand, if the rear end of the sample medium has passed the positions of all of the medium sensors, the overlap detection module 152 detects the region information of the region at which overlap has occurred in the fed sample medium based on an ultrasonic signal received from an ultrasonic sensor 115 (step S113). If the medium conveyance apparatus 100 has a plurality of ultrasonic sensors 115, the overlap detection module 152 detects the region information for each of the ultrasonic sensors 115.

The overlap detection module 152 detects the region information based on the position of occurrence of overlap in a sample medium stored in the storage device 140 at step S105. The overlap detection module 152 refers to the positions stored in the storage device 140 and scans the sample medium from the front end to the rear end. The overlap detection module 152 detects the position where overlap occurs as the front end position of the adhered region if the position where overlap occurs adjoins the rear end side of the position where overlap does not occur. Further, the overlap detection module 152 detects the position where overlap occurs as the rear end position of the adhered region if the position where overlap does not occur adjoins the rear end side of the position where overlap occurs. The overlap detection module 152 detects the distance from the front end of the medium to the front end position, rear end position, or center position of the same for each combination of the front end position and rear end position adjoining each other as the position of the adhered region and detects the distance from the front end position to the rear end position as the length of the adhered region.

The region information is detected by an ultrasonic sensor 115 located at a fixed position with respect to the medium moving along the medium conveyance direction A2. Therefore, the region information is detected at the same position in the width direction A4 and shows the region (position and length) in the medium conveyance direction A2.

Next, the correction module 154 determines whether the time difference of passage of the front end of a sample medium over the positions of two medium sensors among the medium sensors calculated at step S111 is a predetermined difference or less (step S114). The predetermined difference is set to a sufficiently small time difference where it is deemed that the medium is not conveyed slanted.

Figure 11:
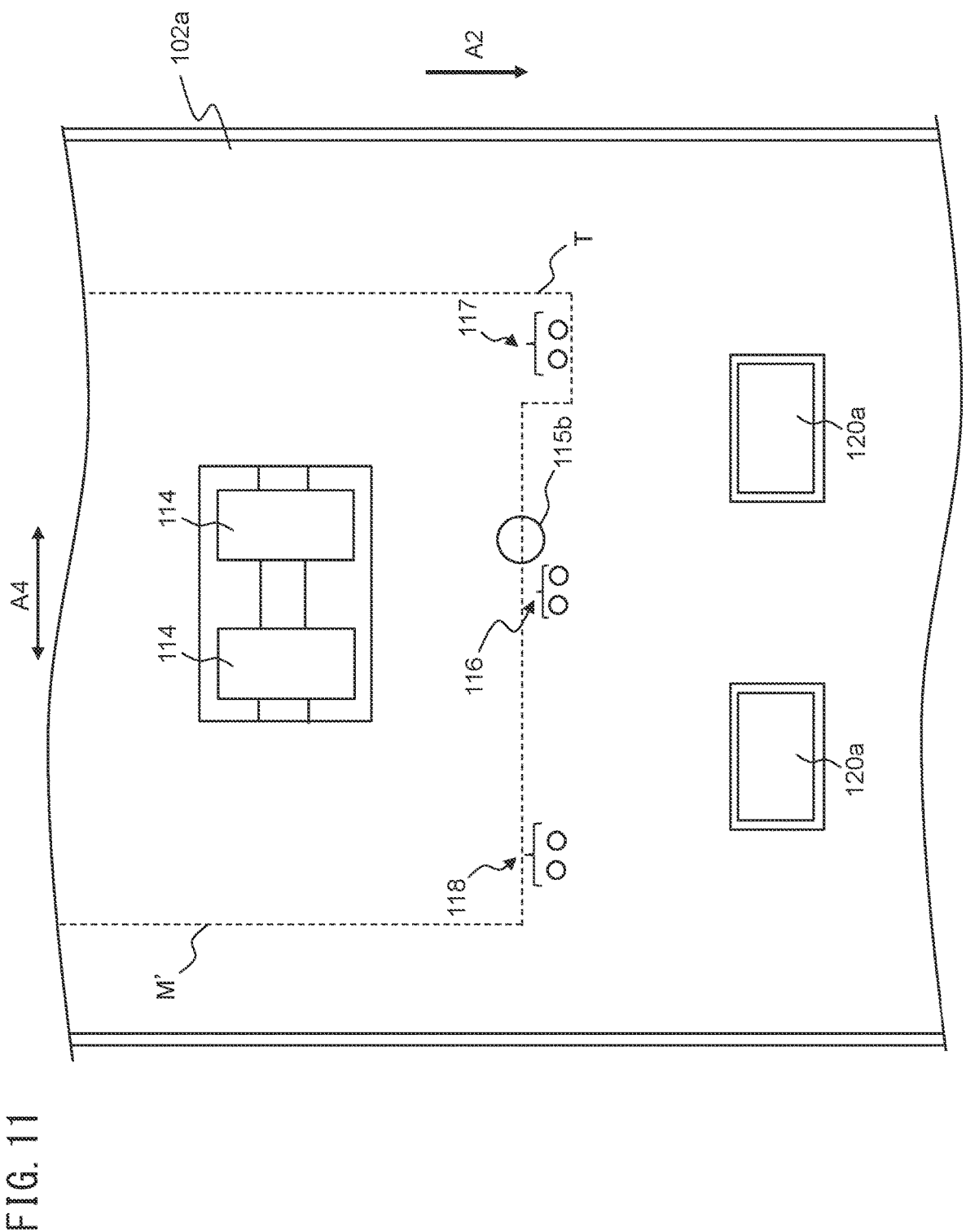
FIG. 11 is a schematic view for explaining a medium having a projecting part.

FIG. 11 is a schematic view for explaining a medium having a projecting part.

FIG. 11 shows an example where a medium M' having an index seal, tab, or other projecting part T at part of its front end is being conveyed without being slanted. In this case, before the front end of the medium M' passes the positions of the first medium sensor 116 and third medium sensor 118, the projecting part T passes the position of the second medium sensor 117. Therefore, despite the medium M' being conveyed without being slanted, the amount of slant detected by the slant detection module 153 becomes larger.

The correction module 154 determines that the medium is not being conveyed slanted if any time difference calculated for the pairs of medium sensors is a predetermined difference or less and proceeds the processing to step S116 without performing the processing of step S115. In other words, the correction module 154 does not correct the region information detected for the sample medium if the time difference of passage of the front end of the fed sample medium over the positions of two medium sensors is a predetermined difference or less. Due to this, the correction module 154 can keep region information from being corrected based on an amount of slant mistakenly detected due to a projecting part and as a result the medium conveyance apparatus 100 can determine with greater precision as to whether multi-feed has occurred.

On the other hand, the correction module 154 determines that the medium is being conveyed slanted if all of the time differences calculated for the pairs of medium sensors are larger than a predetermined difference. In this case, the correction module 154 corrects the region information detected for the fed sample medium based on the amount of slant detected for the fed sample medium (step S115). The correction module 154 corrects the region information so that the region information after correction shows a region of the medium in the long direction of the medium (position with respect to front end of medium or length of medium), i.e., the region of the medium conveyed without slant.

As shown in FIG. 10, if the medium M is conveyed slanted, the distance L between two points positioned on the line running in the medium conveyance direction A2 in the medium M becomes longer than the distance L' between two points of those two points projected on the line running in the length direction of the medium M. If the medium is conveyed slanted by exactly the angle θ with respect to the medium conveyance direction A2, the distance L becomes 1/cos θ time of the distance L'. Therefore, the correction module 154 corrects the region information by for example the following formula (1).

$$R' = R \times \cos\theta \quad (1)$$

Where, R' is the region information after correction, R is the region information before correction, and θ is the angle by which the fed medium is slanted with respect to the medium conveyance direction A2.

Next, the storage control module 155 enters the region information corrected for the fed sample medium in the region table to store it in storage device 140 (step S116) and ends the series of steps. The storage control module 155 assigns a region ID to the region information and enters them into the region table linked together. Note that, if the region information is not corrected, the storage control module 155 enters the uncorrected region information into the region table.

Figure 12:
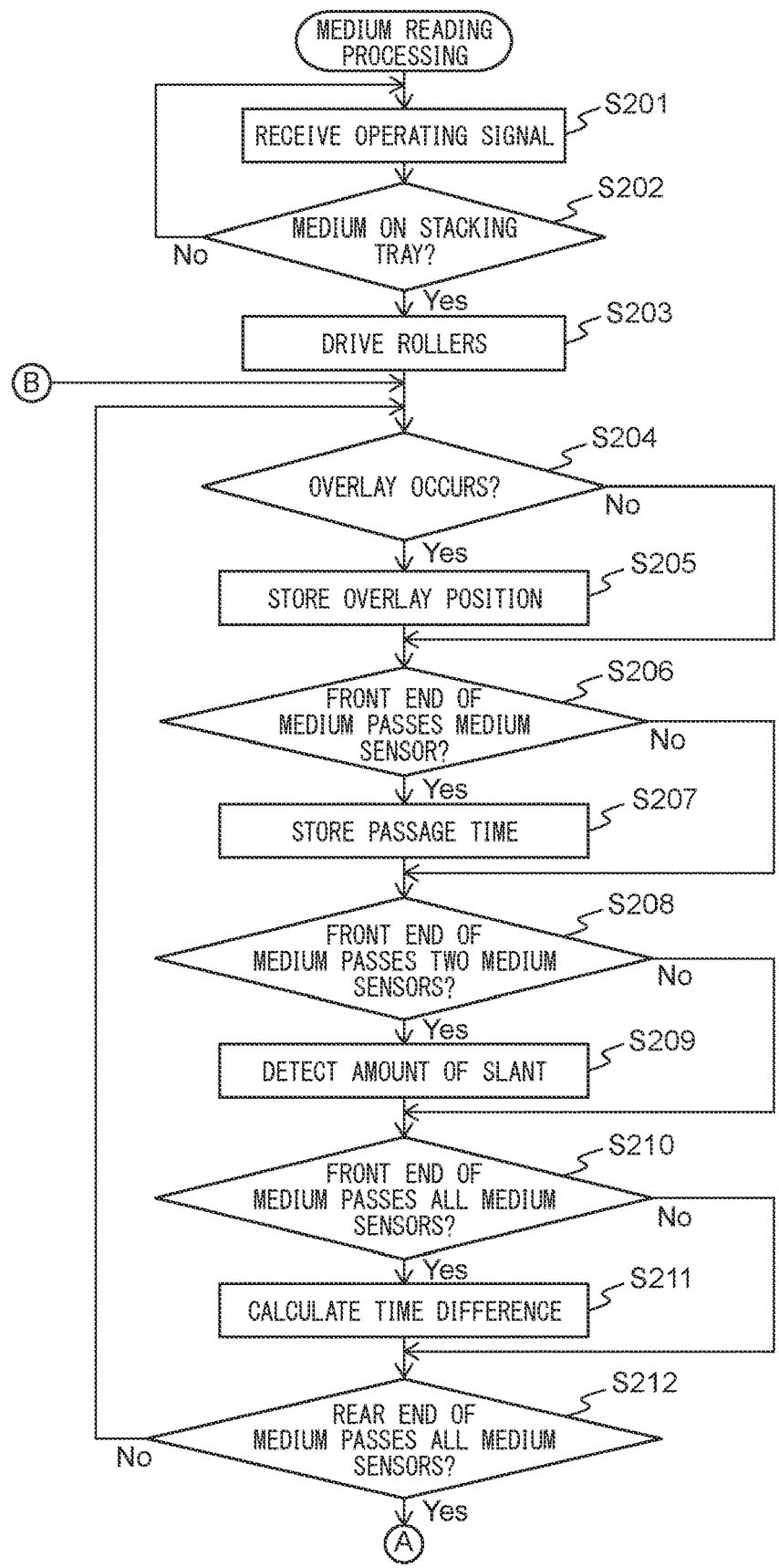
FIG. 12 is a flow chart showing an example of operation of medium reading processing.
Figure 13:
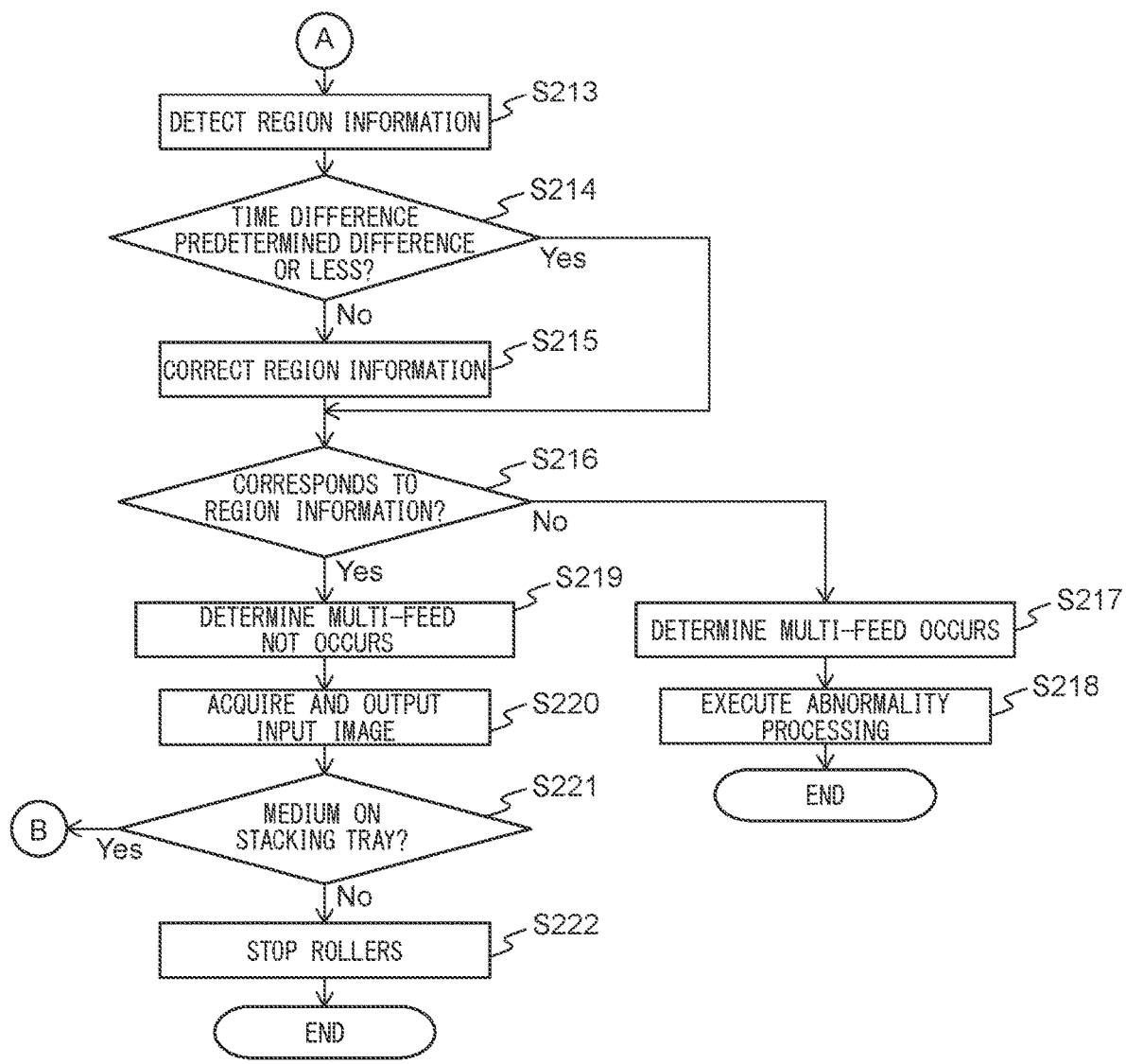
FIG. 13 is a flow chart showing an example of operation of medium reading processing.

FIG. 12 and FIG. 13 are flow charts showing the operation of medium reading processing.

Below, referring to the flow charts shown in FIG. 12 and FIG. 13, an example of the operation of medium reading processing of the medium conveyance apparatus 100 will be explained. Note that the flow of the operation explained below is mainly performed by the processing circuit 150 in cooperation with the elements of the medium conveyance apparatus 100 based on a program stored in advance in the storage device 140. The medium reading processing is performed in the state where the medium to be read is set at the stacking tray 103 by the user. The medium to be read includes various types of media and in particular includes media of the same type as the sample medium registered by registration processing.

The processing of steps S201 to S214 is similar to the processing of steps S101 to S114 of FIG. 5. However, the processing circuit 150 performs the processing of steps S201 to S214 on the currently conveyed medium. In other words, at step S209, the slant detection module 153 detects the amount of slant of the fed medium based on the first medium signal, second medium signal, and third medium signal from the first medium sensor 116, second medium sensor 117, and third medium sensor 118. At step S211, the slant detection module 153 calculates the time difference of passage of the front end of a fed medium over the positions of two medium sensors among the medium sensors. At step S213, the overlap detection module 152 detects region information of the region in which overlap has occurred in a fed medium based on the ultrasonic signal received from an ultrasonic sensor 115.

Further, at step S215, the correction module 154 corrects the region information detected for the fed medium based on the slant information detected for the fed medium. However, the correction module 154 does not correct the region information detected for the medium if the time difference of passage of the front end of the fed medium over the positions of two medium sensors is a predetermined difference or less.

Next, the multi-feed determination module 156 determines whether the region information corrected for the fed medium corresponds to the region information stored in the region table (step S216). If the medium conveyance apparatus 100 has a plurality of ultrasonic sensors 115, the multi-feed determination module 156 detects whether the different region information correspond for each of the ultrasonic sensors 115. The multi-feed determination module 156 determines that the region information corrected for the fed medium does not correspond to region information stored in the region table if either the difference in positions or difference in lengths shown in the region information is larger than a predetermined value. On the other hand, the multi-feed determination module 156 determines that the region information corrected for the fed medium corresponds to region information stored in the region table if all of the difference in positions and the difference in lengths shown in the region information are a predetermined value or less. The predetermined value is set to a sufficiently small value where an adhered region in the fed medium appears the same as the adhered region in the sample medium. Note that if the region information is not corrected, the storage control module 155 determines whether the region information not corrected for the fed medium corresponds to region information stored in the region table.

If the region information corrected for the fed medium does not correspond to the region information stored in the region table, the multi-feed determination module 156 determines that multi-feed of the medium has occurred (step S217). In other words, the multi-feed determination module 156 determines that multi-feed of the medium has occurred if the region information detected for the medium fed after the region information corrected for the sample medium has been stored in the region table does not correspond to the stored region information.

Next, the control module 151 performs abnormality processing (step S218) and ends the series of steps. The control module 151, as abnormality processing, stops the motor 131 to stop the feed and conveyance of the medium. Further, the control module 151, as abnormality processing, displays information showing the occurrence of multi-feed of the medium on the display device 106 or sends it through the interface device 132 to the information processing apparatus to notify the user. Note that, the control module 151, as abnormality processing, may also make the medium reading processing stop after ejecting the medium currently being conveyed. Further, as abnormality processing, the control module 151 may drive the motor 131 to control the conveying part so as to feed the medium backward and return it once to the stacking tray 103, then again feed it. Due to this, the user no longer needs to restack the medium on the stacking tray 103 and refeed it and the control module 151 can improve user friendliness.

On the other hand, if the region information corrected for the fed medium corresponds to the region information stored in the region table, the multi-feed determination module 156 determines that a medium of the same type as the sample medium is being fed and determines that multi-feed of the medium has not occurred (step S219). In other words, the multi-feed determination module 156 determines that multi-feed of the medium has not occurred if the region information detected for the medium fed after the region information corrected for the sample medium has been stored in the region table corresponds to the stored region information.

Next, the control module 151 acquires an input image from an imaging device 121 and sends the acquired input image through the interface device 132 to the information processing apparatus, to output it (step S220).

Next, the control module 151 determines whether a medium remains at the stacking tray 103 based on the control signal received from the contact sensor 111 (step S221). If a medium remains at the stacking tray 103, the control module 151 returns the processing to step S204 and repeats the processing of steps S204 to S221.

On the other hand, if a medium does not remain on the stacking tray 103, the control module 151 stops the motor 131 to stop the rollers (step S222) and ends the series of steps.

Note that, steps S110, S111, S114 of FIG. 7 and FIG. 8 and/or steps S210, S211, S214 of FIG. 12 and FIG. 13 may also be omitted. Further, step S115 of FIG. 8 may be omitted and, at step S116, the storage control module 155 may enter the region information detected for the fed sample medium linked with the amount of slant without correcting it. In this case, at step S215 of FIG. 13, the correction module 154 corrects the region information so that the region information after correction shows the region of the medium in the case where the medium is conveyed slanted by exactly the amount of slant stored in the region table.

Further, the registration processing may be omitted and common region information may be set at each device at the time of shipment of the device. Further, the medium conveyance apparatus 100 may also send the region information stored by the registration processing to the outside through the interface device 132 to enable it to be used at another medium conveyance apparatus rather than use it at its own device.

Further, the medium conveyance apparatus 100 may have a thickness sensor instead of an ultrasonic sensor 115 and the overlap detection module 152 may detect region information of the region where overlap occurs in a fed medium based on the thickness of the medium. The thickness sensor includes a light emitter and a light receiver. The light emitter and the light receiver are located in the vicinity of the conveyance path of the medium facing each other across the conveyance path. The light emitter emits light toward the light receiver (infrared light or visible light). On the other hand, the light receiver receives light emitted by the light emitter and generates and outputs an electric signal corresponding to the intensity of the light received as a thickness signal. The light emitted by the light emitter attenuates the larger the thickness of the medium, so the light receiver generates the thickness signal so that the signal value becomes larger the smaller the intensity of the light received.

Note that, as the thickness sensor, a reflected light sensor, pressure sensor, or mechanical type sensor may also be used. The reflected light sensor includes a pair of a light emitter and light receiver provided at one side of the conveyance path of the medium and a pair of a light emitter and light receiver provided at the other side. The reflected light sensor detects the distances between the pairs and the surfaces of the medium, based on the time from when one pair emits light to one surface of the medium to when it receives the reflected light and the time from when the other pair emits light to the other surface of the medium to when it receives the reflected light. The reflected light sensors generate the thickness signal showing values of the distances between the two pairs minus the detected distances. The pressure sensor detects pressure which changes according to the thickness of the medium and generates the thickness signal showing the detected pressure. The mechanical type sensor detects the amount of movement of a roller contacting the medium and generates the thickness signal showing the detected amount of movement.

In this case, at step S104 of FIG. 7 and step S204 of FIG. 12, the overlap detection module 152 determines that overlap of the medium has occurred if the signal value of the thickness signal is the determination threshold value or more. On the other hand, the overlap detection module 152 determines that overlap of the medium has not occurred if the signal value of the thickness signal is less than the determination threshold value.

Further, at step S109 of FIG. 7 and step S209 of FIG. 12, the slant detection module 153 may detect the amount of slant of the fed medium based on the input image of the medium which the imaging device 121 captures. In this case, the slant detection module 153 utilizes known image processing technology to extract edge pixels from the input image and detects a rectangular region surrounded by the extracted edge pixels. The slant detection module 153 detects the angle formed by the direction of extension of the front end of the detected rectangular region and the horizontal direction as the amount of slant of the fed medium.

As explained in detail above, the medium conveyance apparatus 100 has the function of determining that multi-feed of a medium has not occurred if the position and length at which overlap occurs in a medium matches a position and length stored in advance. At the time of use of its function, the medium conveyance apparatus 100 determines whether the positions and lengths of a region in which overlap has occurred in a medium match after correction in accordance with the amount of slant of the medium. Due to this, the medium conveyance apparatus 100 can correctly determine whether the position and length at which overlap has occurred in a medium match a position and length stored in advance even when a medium is conveyed slanted. Therefore, the medium conveyance apparatus 100 can with greater precision as to whether multi-feed of the medium has occurred.

In particular, the medium conveyance apparatus 100 can avoid mistakenly determining that multi-feed has occurred and from causing conveyance of the medium to stop when a medium to which a photograph or stamp or other specific medium is attached is conveyed. Due to this, the medium conveyance apparatus 100 can minimize the increase in total time taken for medium reading processing. Further, a user no longer needs to restack a medium on the stacking tray 103 and refeed it, and thus the medium conveyance apparatus 100 can improve in user-friendliness.

FIG. 14 is a view showing the schematic constitution of a processing circuit 250 of a medium conveyance apparatus according to another embodiment.

The processing circuit 250 is used instead of the processing circuit 150. Instead of the processing circuit 150, it performs registration processing and medium reading processing, etc. The processing circuit 250 has a control circuit 251, overlap detection circuit 252, slant detection circuit 253, correction circuit 254, storage control circuit 255, multi-feed determination circuit 256, etc. Note that, these modules may be configured by respectively independent integrated circuits, microprocessors, firmware, etc.

The control circuit 251 is one example of a control module and has a similar function to the control module 151. The control circuit 251 receives an operation signal from the operating device 105 or interface device 132, receives the contact signal from the contact sensor 111, and controls the motor 131 to feed and convey the medium based on the received signals. The control circuit 251 acquires the input image from the imaging devices 121 and outputs it to the interface device 132. Further, the control circuit 251 reads the result of determination of whether multi-feed has occurred from the storage device 140 and performs abnormality processing if it determines that multi-feed of the medium has occurred.

The overlap detection circuit 252 is one example of an overlap detection module and has a function similar to the overlap detection module 152. The overlap detection circuit 252 receives the ultrasonic signal from the ultrasonic sensor 115, detects the region information of a region in which overlap has occurred in the medium based on the received ultrasonic signal, and stores it in the storage device 140.

The slant detection circuit 253 is one example of a slant detection module and has a function similar to the slant detection module 153. The slant detection circuit 253 receives the first medium signal from the first medium sensor 116, the second medium signal from the second medium sensor 117, and the third medium signal from the third medium sensor 118, detects the amount of slant of the medium based on the received signals, and stores it in the storage device 140.

The correction circuit 254 is one example of a correction module and has a function similar to the correction module 154. The correction circuit 254 reads the amount of slant of the medium and the region information of the region where overlap has occurred in the medium from the storage device 140, corrects the region information based on the read amount of slant, and stores it in the storage device 140.

The storage control circuit 255 is one example of a storage control module and has a function similar to the storage control module 155. The storage control circuit 255 reads the region information corrected for the sample medium from the storage device 140 and stores it in the storage device 140 so as to enter it in the region table.

The multi-feed determination circuit 256 is one example of a multi-feed determination module and has a function similar to the multi-feed determination module 156. The multi-feed determination circuit 256 reads the region information corrected for the medium currently fed from the storage device 140 and the region information stored in the region table, determines whether multi-feed of the medium has occurred based on the read region information, and stores the determination results in the storage device 140.

As explained in detail above, the medium conveyance apparatus can determine with greater precision as to whether multi-feed of the medium has occurred even if performing medium reading processing and registration processing by the processing circuit 250.

REFERENCE SIGNS LIST

100. medium conveyance apparatus, 113. feed roller, 115. ultrasonic sensor, 116. first medium sensor, 117. second medium sensor, 118. third medium sensor, 140. storage device, 152. overlap detection module, 153. slant detection module, 154. correction module, 155. storage control module, 156. multi-feed determination module

What is claimed is:

1. A medium conveyance apparatus comprising:
a storage device to store in advance region information of a predetermined region in a medium;
a feed roller to feed the medium; and
a processor to
detect an amount of slant of the fed medium,
detect region information of a region in which overlap has occurred in the fed medium,
correct the detected region information based on the amount of slant, and
determine that multi-feed of the medium has occurred if the corrected region information does not correspond to the stored region information and determine that multi-feed of the medium has not occurred if the corrected region information corresponds to the stored region information.

2. The medium conveyance apparatus according to claim 1, wherein
the processor detects the amount of slant of a fed sample medium, wherein
the processor detects region information of a region in which overlap has occurred in the fed sample medium, wherein
the processor corrects the region information detected for the fed sample medium based on the amount of slant detected for the fed sample medium, and wherein
the processor stores in the storage device the region information corrected for the fed sample medium as the region information of the predetermined region.

3. The medium conveyance apparatus according to claim 1, further comprising an ultrasonic sensor including an ultrasonic emitter to emit an ultrasonic wave and an ultrasonic receiver located facing the ultrasonic emitter to generate an ultrasonic signal corresponding to a received ultrasonic wave, wherein
the processor detects the region information of the region in which overlap has occurred in the fed medium based on the ultrasonic signal.

4. The medium conveyance apparatus according to claim 1, further comprising a plurality of medium sensors located at intervals in a direction perpendicular to the medium conveyance direction, wherein
the processor detects the amount of slant of the fed medium based on output signals from the plurality of medium sensors.

5. The medium conveyance apparatus according to claim 4, wherein
the plurality of medium sensors include at least three medium sensors, and wherein
the processor does not correct the region information detected for the fed medium if a time difference of passage of the front end of the medium over positions of two medium sensors among the plurality of medium sensors is a predetermined difference or less.

6. A medium conveyance apparatus comprising:
a storage device;
a feed roller to feed a sample medium; and
a processor to
detect an amount of slant of the fed sample medium,
detect region information of a region in which overlap has occurred in the fed sample medium,
correct the detected region information based on the amount of slant,
store the corrected region information in the storage device, and
determine that multi-feed of the medium has occurred if the region information detected for the medium fed after the corrected region information has been stored does not correspond to the stored region information, and determine that multi-feed has not occurred if the region information detected for the medium fed after the corrected region information has been stored corresponds to the stored region information.

7. A method for determining multi-feed, the method comprising:
storing in advance region information of a predetermined region in a medium, in a storage device;
feeding the medium, by a feed roller;
detecting an amount of slant of the fed medium;
detecting region information of a region in which overlap has occurred in the fed medium;
correcting the detected region information based on the amount of slant; and
determining that multi-feed of the medium has occurred if the corrected region information does not correspond to the stored region information and determining that multi-feed of the medium has not occurred if the corrected region information corresponds to the stored region information.

8. The method according to claim 7, wherein
the amount of slant of a fed sample medium is detected, wherein
region information of a region in which overlap has occurred in the fed sample medium is detected, wherein
the region information detected for the fed sample medium is corrected based on the amount of slant detected for the fed sample medium, and wherein
the region information corrected for the fed sample medium is stored in the storage device as the region information of the predetermined region.

9. The method according to claim 7, wherein the region information of the region in which overlap has occurred in the fed medium is detected based on a ultrasonic signal generated by an ultrasonic receiver located facing an ultrasonic emitter to emit an ultrasonic wave to generate the ultrasonic signal corresponding to a received ultrasonic wave.

10. The method according to claim 7, wherein the amount of slant of the fed medium is based on output signals from a plurality of medium sensors located at intervals in a direction perpendicular to the medium conveyance direction.

11. The method according to claim 10, wherein
the plurality of medium sensors include at least three medium sensors, and wherein
the region information detected for the fed medium is not corrected if a time difference of passage of the front end of the medium over positions of two medium sensors among the plurality of medium sensors is a predetermined difference or less.

12. A method for determining multi-feed, the method comprising:
feeding a sample medium by a feed roller;
detecting an amount of slant of the fed sample medium;
detecting region information of a region in which overlap has occurred in the fed sample medium;
correcting the detected region information based on the amount of slant;
storing the corrected region information in a storage device; and
determining that multi-feed of the medium has occurred if the region information detected for the medium fed after the corrected region information has been stored does not correspond to the stored region information, and determining that multi-feed has not occurred if the region information detected for the medium fed after the corrected region information has been stored corresponds to the stored region information.

* * * * *

UNITED STATES PATENT AND TRADEMARK OFFICE
CERTIFICATE OF CORRECTION

PATENT NO. : 12,330,903 B2  
APPLICATION NO. : 18/252595  
DATED : June 17, 2025  
INVENTOR(S) : Hiroyuki Kitano et al.

Page 1 of 1

It is certified that error appears in the above-identified patent and that said Letters Patent is hereby corrected as shown below:

In the Drawings

In Sheet 5 of 13, Fig. 5, Reference numeral 142, Line 1, delete "OVERLAY" and insert -- OVERLAP --.

In Sheet 5 of 13, in Fig. 5, Reference numeral 152, Line 1, delete "OVERLAY" and insert -- OVERLAP --.

In Sheet 6 of 13, in Fig. 7, Reference numeral S104, Line 1, delete "OVERLAY" and insert -- OVERLAP --.

In Sheet 6 of 13, in Fig. 7, Reference numeral S105, Line 1, delete "OVERLAY" and insert -- OVERLAP --.

In Sheet 11 of 13, in Fig. 12, Reference numeral S204, Line 1, delete "OVERLAY" and insert -- OVERLAP --.

In Sheet 11 of 13, in Fig. 12, Reference numeral S205, Line 1, delete "OVERLAY" and insert -- OVERLAP --.

In Sheet 13 of 13, in Fig. 14, Reference numeral 252, Line 1, delete "OVERLAY" and insert -- OVERLAP --.

Signed and Sealed this  
Thirtieth Day of September, 2025

John A. Squires  
*Director of the United States Patent and Trademark Office*